United States Patent

[11] 3,573,431

[72] Inventors Hugh J. Tyler
Santa Ana;
James R. Willson, Garden Grove, Calif.
[21] Appl. No. 863,275
[22] Filed Oct. 2, 1969
[45] Patented Apr. 6, 1971
[73] Assignee Robertshaw Controls Company
Richmond, Va.

[54] AUTOMATIC MEAT COOKING SYSTEM
15 Claims, 1 Drawing Fig.

[52] U.S. Cl. ............................................. 219/516
[51] Int. Cl. ............................................. H05b 1/02
[50] Field of Search ................................. 219/487, 506, 516

[56] References Cited
UNITED STATES PATENTS
2,914,644 11/1959 Holtkamp .................. 219/516

*Primary Examiner*—Bernard A. Gilheany
*Assistant Examiner*—F. E Bell
*Attorneys*—Auzville Jackson, Jr., Robert L. Marben and Anthony A. O'Brien ABSTRACT: An automatic meat cooking system including a probe for sensing the internal temperature of a piece of meat, an indicator assembly including an internal temperature responsive member movable in response to temperature sensed by the probe to continuously indicate the actual internal temperature of the meat and a vane adapted to permit the triggering of a detecting circuit when the vane is in a predetermined position with respect to a temperature adjusting member such that the detecting circuit energizes a load to cool an oven from cooking temperature to holding temperature while anticipating the cooking of the meat during the cooling period.

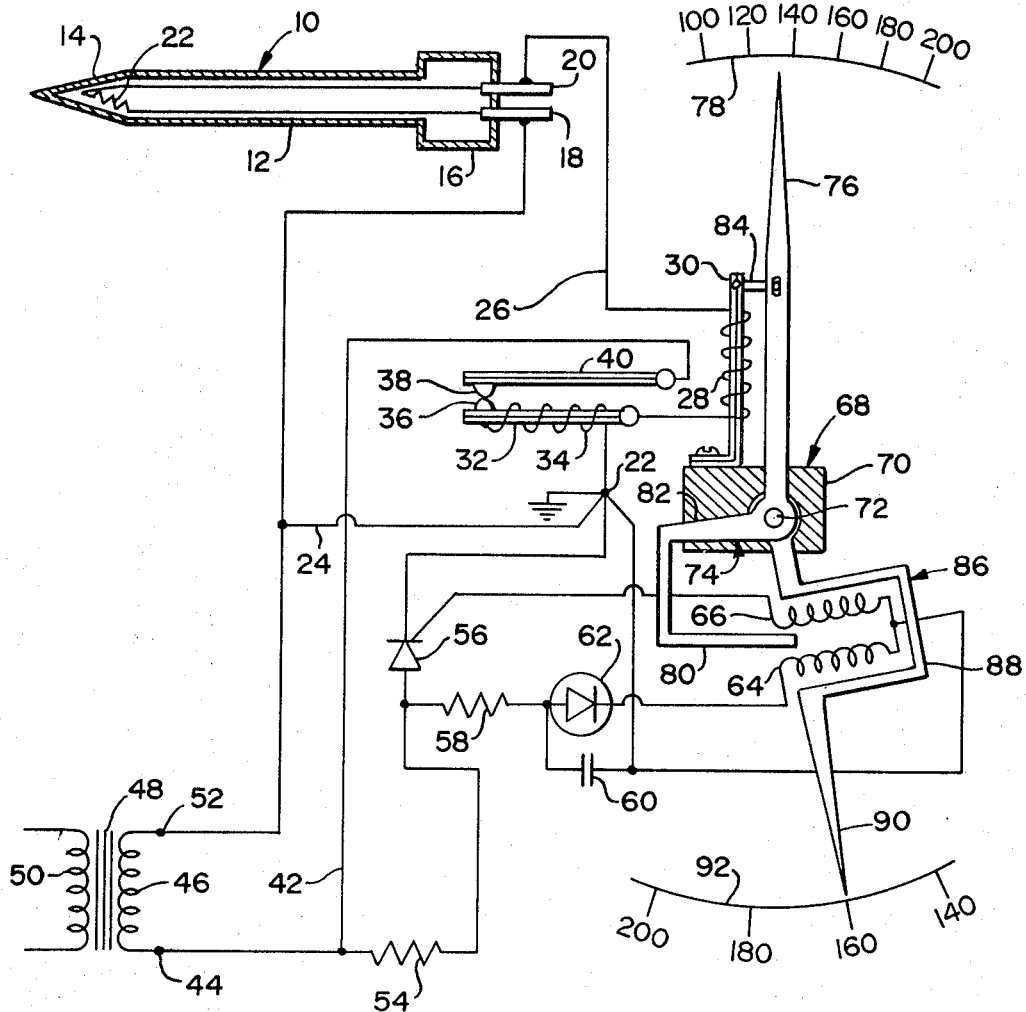

AUTOMATIC MEAT COOKING SYSTEM

BACKGROUND OF THE INVENTION

1. Field of the Invention

The present invention pertains to automatic cooking systems and more particularly to such systems for cooking meat to a predetermined doneness.

2. Description of the Prior Art

In order to cook meat in ovens, a cook determines the required cooking time at a standard cooking temperature, such as 325° F, from a chart of cooking time per pound for various types of meat and desired doneness. The required cooking time is set on a timer and the oven thermostat is set at the cooking temperature. The meat is then cooked in the oven at the cooking temperature for the required time after which the timer signals a special oven control which cools the oven to a holding temperature of approximately 170° F. The holding temperature maintains the meat at serving temperature without continuing to cook the meat such that the meat may be withdrawn from the oven and served at any time.

The above mentioned manner of utilizing modern ovens has the disadvantage that the required cooking time for meat depends on various factors such as the temperature of the meat at the beginning of the cooking operation, the quality and type of the meat, the accuracy of the weight determination, the accuracy of the timer as set by the cook, the accuracy of the oven thermostat, and the accuracy of the calculation of required cooking time. Due to the many inaccuracies noted above, many automatic systems have been devised which sense the internal temperature or doneness of the meat in some manner and control the oven accordingly. These prior systems all have at least one major deficiency. For instance, the system of Pat. No. 2,933,585 will not reduce the oven temperature before the final desired meat temperature is obtained while still providing a direct indication of internal meat temperature, and the system of Pat. No. 3,003,048 utilizes an anticipation heater which provides a false indication of internal meat temperature.

Depending on the doneness desired and the type of meat being cooked, anticipation must be provided to compensate for cooking of the meat during cooling of the oven from the standard cooking temperature to the holding temperature. For instance, rare roast beef is done at an internal temperature of approximately 140° F; and, accordingly, it is essential that the oven thermostat be moved to the holding position from the cooking position approximately 25° to 50° F. prior to the obtention of the desired internal meat temperature of 140° F, to prevent overcooking during the cooling period. At higher meat doneness temperatures, such as 200° F. for fowl, the tendency to overcook while the oven is cooling from the cooking temperature to the holding temperature decreases; and, thus, less anticipation is required. That is, the oven thermostat should not be moved to the holding position until the internal meat temperature is almost 200° F.

Anticipation in prior automatic systems has been accomplished with mechanical switches such that calibration and adjustment of anticipation are extremely difficult. Furthermore, prior systems have failed to provide accurate anticipation.

SUMMARY OF THE INVENTION

Accordingly, it is an object of the present invention to continuously indicate internal meat temperature in an automatic meat cooking system.

Another object of the present invention is to accurately anticipate the cooking of a piece of meat during the cooling of an oven from cooking temperature to holding temperature.

A further object of the present invention is to display internal meat temperature and desired doneness on separate indicators.

The present invention has another object in that an automatic meat cooking system includes a detecting circuit for accurately determining when the internal temperature of a piece of meat is in proper anticipatory relation with the desired doneness to reset an oven thermostat to a holding temperature.

Another object of the present invention is to provide an automatic meat cooking system that is compatible with modern ovens and easily understood.

Some of the advantages of the present invention over prior automatic cooking systems are that cooking during oven cooling is accurately anticipated, the system is easily understood and operated, the actual internal meat temperature is always on display, and the system is easily adjusted and calibrate for anticipation.

The present invention is generally characterized in a automatic meat cooking system including a temperature sensing probe for sensing the internal temperature of a piece of meat, an indicator assembly in circuit with the probe for indicating the internal temperature of the meat, a detecting circuit connected with the indicator assembly and responsive to the indication of internal temperature thereof to energize a load to cool an oven whereby the internal temperature of the meat is continuously displayed by the indicator assembly.

Further objects and advantages of the present invention will become apparent from the following description of a preferred embodiment taken in conjunction with the accompanying drawing.

BRIEF DESCRIPTION OF THE DRAWING

The FIGURE is a partially schematic illustration of an automatic meat cooking system according to the present invention.

DESCRIPTION OF THE PREFERRED EMBODIMENT

An automatic meat cooking system according to the present invention is illustrated in the drawing and includes a probe 10 encased in a sheath 12 made of heat conductive material for insertion into the meat to be cooked. Sheath 12 has a pointed end 14 and a terminal end 16 from which a pair of terminals 18 and 20 extend. A thermistor 22 having a negative temperature coefficient of resistance is disposed in pointed end 14 and is electrically connected between terminals 18 and 20.

Terminal 18 is grounded at a junction 22 through a lead 24, and terminal 20 is connected to ground junction 22 through a lead 26, a heating element 28 which is wound around a bimetal arm 30, a bimetal arm 32 and a heating element 34 wound around bimetal arm 32. Bimetal arm 32 carries a contact 36 on a movable end thereof, which contact is adapted to connect with a contact 38 carried on the movable end of a bimetal arm 40 disposed in parallel relation with bimetal arm 32. Bimetal arm 40 is electrically connected through a lead 42 with an end 44 of a secondary winding 46 of a transformer 48 having a primary winding 50 adapted to be connected with a suitable AC source of electricity. The other end 52 of secondary winding 46 is connected with ground junction 22 through lead 24.

A load 54 is connected with end 44 of secondary winding 46 and is in series with a silicon controlled rectifier (SCR) 56. The anode of SCR 56 is connected with one terminal of resistor 58, as well as load 54, and the other terminal of resistor 58 is connected to ground junction 22 through a first parallel path including a capacitor 60 and a second parallel path including a breakdown diode 62 and a coil 64. The gate of SCR 56 is connected to ground junction 22 through a coil 66 which is spaced from coil 64, and the cathode of SCR 56 is connected directly with ground junction 22.

An indicator assembly generally indicated at 68 includes a stationary base 70 having a rod 72 secured thereto. A temperature responsive member, indicated generally at 74, is mounted on rod 72 so as to pivot freely thereon and includes a pointer 76 disposed adjacent a scale 78 having temperature gradient markings corresponding to actual internal meat temperature. A right angled van 80 extends from an arm 82 disposed transverse to pointer 76 such that the end of vane 80 is in parallel relation with arm 82. Bimetal arm 30 is L-shaped in side elevation with the small leg thereof secured to base 70. A connecting link 84 is secured to pointer 76 and the movable end of bimetal arm 30 such that pointer 76 follows movement of bimetal arm 30. A temperature adjusting member, generally indicated at 86, is secured to rod 72 in a manner such that it is movable with the rod. Member 86 includes an offset support portion 88 and a pointer 90 extending from portion 88 to a position adjacent scale 92 having temperature gradient markings corresponding to the desired internal temperature or doneness of the meat. Coils 64 and 66 are supported by offset portion 88 in a stationary spaced manner such that coils 64 and 66 move with adjustment of member 86.

Indicator assembly 68 is positioned adjacent the oven such that the cook can easily set the desired doneness by turning a knob, not shown, connected with rod 72 and such that the actual internal meat temperature may be determined by the position of pointer 76 with respect to scale 78. Probe 10 will normally have an electrical cord connected therewith with a plug at the end thereof corresponding to terminals 18 and 20 such that the plug may be inserted in a receptacle in the oven which is in circuit with the system as illustrated in the drawing. Load 54 may be any type of operator for a conventional thermostat recalibration mechanism which is operable to change the set point of the oven thermostat from a cooking temperature to a holding temperature upon energization.

In operation a piece of meat to be cooked is placed in the oven which is controlled by a conventional oven thermostat. Temperature sensing probe 10 is inserted in the meat, and terminals 18 and 20 of probe 10 are electrically connected with the system through the cord. The timer for the oven is disconnected such that the automatic meat cooking system of the present invention may have full control of the oven, and the oven thermostat is set to a normal cooking or roasting temperature, such as 325° F. The knob connected with rod 72 of indicator assembly 68 is rotated to set the desired internal temperature or doneness of the meat. Rotation of the knob turns rod 72; and, accordingly, rotates temperature adjusting member 86 such that pointer 90 indicates the desired doneness of the meat on scale 92 and coils 64 and 66 are precisely positioned to provide proper anticipation.

The temperature of the oven will rise to 325° F. and holds at that temperature under the control of the oven thermostat. As the meat cooks the internal temperature or doneness of the meat increases as indicated by clockwise movement of pointer 76 with respect to scale 78. That is, a current path may be traced from end 44 of secondary winding 46 through lead 42, bimetal arm 40, bimetal arm 32, heating element 28, lead 26, terminal 20, thermistor 22 and terminal 18 of probe 10 to ground. Since the initial internal temperature of the meat is low, thermistor 22 will have a high resistance due to its negative temperature coefficient of resistance, and the voltage drop across heating element 28 will be low due to the voltage divider effect obtained by the series connection of thermistor 22 and heating element 28. Accordingly, the heat from heating element 28 will be low, and bimetal arm 30 will deflect only slightly. As the internal temperature of the meat increases the resistance of thermistor 22 decreases such that more heat is provided by heating element 28 to accordingly cause increased deflection of bimetal arm 30 with increasing internal meat temperature. Pointer 76 pivots clockwise about rod 72 with increasing internal meat temperature as it follows bimetal arm 30 to indicate the actual internal meat temperature on scale 78.

When the internal temperature of the meat as sensed by probe 10 increases to a point such that the meat will obtain the desired doneness due to cooking as the oven cools, SCR 56 is rendered conductive to energize operation 54 as follows. On positive half cycles of the supply voltage, capacitor 60 charges through operator 54 and resistor 58. Breakdown diode 62 is a unidirectional conducting device having a predetermined breakdown voltage, such as a four-layer or Schockley diode. Thus, when the voltage across capacitor 60 increases to the predetermined breakdown voltage of diode 62, diode 62 will be rendered conductive to discharge the capacitor and provide a sharp positive pulse to coil 64. Capacitor 60 has a small capacitance such that a negative pulse following the initial positive pulse is very small and insufficient to render diode 62 nonconducting. Thus, diode 62 remains conducting for the remainder of the positive half cycle. The initial pulse or spike through coil 64 is air-coupled to coil 66 to place a positive pulse on the gate of SCR 56 to render the SCR conducting if vane 80 is sufficiently removed from between coils 64 and 66. That is, vane 80 acts to suppress coupling between coils 64 and 66; and, accordingly, the conduction of SCR 56 depends upon the position of vane 80 with respect to coils 64 and 66. It may be seen that the initial adjustment of the member 86 positions coils 64 an 66 to sense the proximity of vane 80 and provide anticipation by controlling the internal meat temperature at which operator 54 is energized.

Energization of operator 54 resets the oven thermostat to a holding temperature, such as 170° F. and, as the oven cools from 325° F. to 170° F. the meat continues to cook. By properly calibrating scale 92, the cooking during the cooling period is anticipated such that the meat is cooked to the precise doneness desired. The scale 92 may be easily adjusted or calibrated linearly or nonlinearly for accurate anticipation since the scale is accessible without interference with the other components of the system.

Temperature adjusting member 86 is illustrated in the drawing after being set for doneness of 160° F. and, accordingly, it can be seen that vane 80 will be sufficiently moved to permit coupling between coils 64 and 66 when the internal meat temperature is approximately 140° F. to thereby anticipate a 20° F. increase in internal meat temperature caused by cooking during the cooling period. Similarly, if the desired doneness is 200° F. vane 80 will be sufficiently moved to permit coupling between coils 64 and 66 when the internal meat temperature is approximately 190° F. to anticipate 10° F. cooking during the cooling period.

Thermistor 22 and heating element 28 are in a separate circuit from operator 54 and SCR 56; and, thus, the resetting operation of the oven thermostat in no way interferes with the operation of pointer 76 such that an indication of actual internal meat temperature is continuously presented regardless of operation of the oven. Thus, while automatic cooking is precisely provided under normal circumstances, if any components in the system should fail the cook has the actual internal meat temperature available such that he may manually turn off the oven or remove the meat.

Bimetal arms 32 and 40 cooperate with heating element 34 in the temperature sensing and indicating circuit in order to compensate for supply voltage variations to assure that pointer 76 is operated accurately with respect to the internal meat temperature sensed by thermistor 22. Bimetal arm 40 provides ambient temperature compensation and bimetal arm 32 controls the connection between contacts 36 and 38 such that the duration of electricity that is supplied to heating element 28 during a cycle is controlled to compensate for overvoltage and undervoltage conditions.

The detector circuit is illustrated as including an SCR in order that large currents may be supplied to load 54; however, it is clear that various more sensitive devices may be utilized to detect the coupling of a pulse between coils 64 and 66. If an SCR or other high power controlled rectifier is desired to control the electrical power to the load, more sensitive detecting devices may be utilized to detect a pulse and render the controlled rectifier conductive.

In as much as the present invention is subject to many variations, modifications and changes in detail, it is intended that all matter contained in the foregoing description or shown in the accompanying drawings shall be interpreted as illustrative and not in a limiting sense.

We claim:

1. An automatic meat cooking system for use with an oven comprising:
   input means adapted to be connected with a source of electricity;

a temperature sensing probe connected with said input means for insertion into a piece of meat to sense the internal temperature thereof;

an indicator assembly including internal temperature indicating means in a first circuit with said probe and said input means and responsive to said probe to indicate the internal temperature of the meat, adjusting means for selecting a desired doneness, and anticipation means adjustable by said adjusting means and responsive to said internal temperature indicating means;

said anticipation means including first and second spaced coils, and said internal temperature indicating means being movably disposed in the space between said first and second coils;

load means adapted to control the temperature in the oven; and detecting means in a second circuit with said load means and said input means, said detecting means being connected with said anticipation means and responsive to said internal temperature indicating means to energize said load means when a predetermined internal temperature of the meat is obtained whereby the temperature in the oven is controlled in accordance with the internal temperature of the meat and the internal temperature of the meat is continuously displayed by said indicator assembly.

2. The invention as recited in claim 1 wherein said probe includes a thermistor having a resistance varying with temperature, and said internal temperature indicating means includes a member movable in response to the resistance of said thermistor.

3. The invention as recited in claim 2 wherein said member includes a vane disposed adjacent said anticipation means and movable with respect to said anticipation means in accordance with the internal meat temperature.

4. The invention as recited in claim 3 wherein said adjusting means includes a movable pointer, and wherein said first and second coils are mounted in spaced relation on said pointer, said first coil having a first end coupled to a reference potential and a second end coupled through a pulsing network to said input means, said second coil having a first end coupled to said reference potential and a second end coupled to said detecting means, and said vane is movable in the space between said first and second coils.

5. The invention as recited in claim 4 wherein said detecting means includes a controlled rectifier having a gate electrode connected with said second end of said second coil.

6. The invention as recited in claim 5 wherein said pulsing network includes a breakdown device having a first terminal coupled with said second end of said first coil and a second terminal, a capacitor coupled between said first end of said first coil and said second terminal of said breakdown device, and a resistor coupled with said second terminal of said breakdown device and said input means.

7. The invention as recited in claim 6 wherein said breakdown device is a unidirectionally conducting diode having a predetermined breakdown voltage.

8. The invention as recited in claim 7 wherein said input means supplies an AC voltage, and said diode is poled to conduct on positive half cycles only.

9. The invention as recited in claim 3 wherein said internal temperature indicating means includes a bimetal arm having a stationary end and a movable end connected with said member, and a heating element adjacent said bimetal arm, said heating element being connected in series with said thermistor whereby the heat from said heating element is controlled in accordance with the internal temperature of the meat such that said bimetal arm moves said member to indicate the internal temperature of the meat.

10. The invention as recited in claim 9 wherein a bimetal compensating network is connected in series with said heating element and said thermistor to compensate for variations in electricity from the source.

11. An automatic meat cooking system for use with an oven comprising:

an input means adapted to be connected with a source of electricity;

a temperature sensing probe connected with said input means for insertion into a piece of meat to sense the internal temperature thereof;

an indicator assembly including internal temperature indicating means connected with said probe and movable to indicate the internal temperature of the meat, set temperature indicating means adjustable to indicate a set temperature and including proximity means operable to provide a signal in response to movement of said internal temperature indicating means, and mounting means movably supporting said internal temperature indicating means and said set temperature indicating means such that said proximity means is stationary and said internal temperature indicating means is movable toward and away from said proximity means;

said proximity means including first and second spaced coils, and said internal temperature indicating means being movably disposed in the space between said first and second coils;

load means connected with said input means and adapted to control the temperature in the oven; and detecting means connected with said proximity means and said load means and responsive to the signal from said proximity means to energize said load means to cool the oven when the internal temperature of the meat is at a predetermined level with respect to the set temperature whereby cooking of the meat during cooling of the oven is anticipated.

12. The invention as recited in claim 11 wherein said first coil is connected with said input means through pulsing means and said second coil is connected with said detecting means.

13. The invention as recited in claim 12 wherein said detecting means includes a controlled rectifier having a gate electrode connected with said second coil, and said internal temperature indicating means includes a vane movable in the space between said first and second coils to suppress air coupling therebetween whereby a pulse is coupled from said first coil to said second coil when the internal temperature of the meat is at said predetermined level to render said controlled rectifier conducting to energize said load means.

14. The invention as recited in claim 14 wherein said probe includes a thermistor, and said internal temperature indicating means includes a heating element in a first circuit with said thermistor and said input means, and said load means, said detecting means and said proximity means are in a second circuit with said input means whereby said internal temperature indicating means continuously indicates the internal temperature of the meat independent of the operation of said load means, said detecting means and said proximity means.

15. The invention as recited in claim 15 wherein a bimetal compensating network is connected in said first circuit to compensate for variations in the electricity from the source, and said pulsing means includes a breakdown diode in series with said first coil, a capacitor connected in parallel across said first coil and said breakdown diode and a resistor connected at one end with said capacitor and said breakdown diode and at the other end with said input means.